(12) United States Patent
Zaffino et al.

(10) Patent No.: US 11,937,084 B2
(45) Date of Patent: *Mar. 19, 2024

(54) SECURE ATTESTATION PACKAGES FOR DEVICES ON A WIRELESS NETWORK

(71) Applicant: AT&T Intellectual Property I, L.P., Atlanta, GA (US)

(72) Inventors: Richard Zaffino, Kirkland, WA (US); Arnold Schrider, Mercer Island, WA (US); Yaron Koral, Cherry Hill, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,530

(22) Filed: Feb. 27, 2023

(65) Prior Publication Data
US 2023/0209347 A1 Jun. 29, 2023

Related U.S. Application Data

(63) Continuation of application No. 16/883,960, filed on May 26, 2020, now Pat. No. 11,595,819.

(51) Int. Cl.
*H04W 4/80* (2018.01)
*H04W 12/08* (2021.01)
*H04W 12/121* (2021.01)
*H04W 48/18* (2009.01)

(52) U.S. Cl.
CPC ............. *H04W 12/08* (2013.01); *H04W 4/80* (2018.02); *H04W 12/121* (2021.01); *H04W 48/18* (2013.01)

(58) Field of Classification Search
None
See application file for complete search history.

(56) References Cited

U.S. PATENT DOCUMENTS

| | | | |
|---|---|---|---|
| 11,595,819 B2 * | 2/2023 | Zaffino | H04W 4/80 |
| 2010/0011214 A1 | 1/2010 | Cha et al. | |
| 2018/0375852 A1 | 12/2018 | Thom et al. | |
| 2019/0319808 A1 | 10/2019 | Fallah et al. | |
| 2019/0349426 A1 | 11/2019 | Smith et al. | |
| 2020/0145409 A1 | 5/2020 | Pochuev et al. | |

* cited by examiner

*Primary Examiner* — Minh Trang T Nguyen

(57) ABSTRACT

A method and apparatus for authenticating a device on a wireless network using a secure attestation package is provided. The method includes receiving, by a processor, information related to a device of an Internet of Thing (IoT) service provider, generating, by the processor, a secure attestation package based on the information, transmitting, by the processor, the secure attestation package to the IoT service provider, receiving, by the processor, a request to access a wireless network of the processor from the device of the IoT service provider, and authorizing, by the processor, the device to access the wireless network based on the secure attestation package.

20 Claims, 6 Drawing Sheets

SECURE ATTESTATION PACKAGES FOR DEVICES ON A WIRELESS NETWORK

This application is a continuation of U.S. patent application Ser. No. 16/883,960, filed on May 26, 2020, now U.S. Pat. No. 11,595,819, which is herein incorporated by reference in its entirety.

The present disclosure relates generally to wireless network security, and more particularly to methods, computer-readable media, and apparatuses for securely connecting to a wireless network using a secure attestation package.

BACKGROUND

Wireless networks are becoming a ubiquitous platform for enabling a variety of different devices to communicate with other devices. The wireless networks can be used to allow non-traditional communication devices to communicate data for analysis and tracking. For example, Internet of Things (IoT) devices are one class of devices that are growing. However, as IoT devices host unknown functionality and are not fully approved, some components of these devices can be used to attack the wireless networks and create security issues for the service provider of the wireless network, devices on the wireless network, or other networks connected to the wireless network of the service provider.

SUMMARY

The present disclosure broadly discloses methods, non-transitory (i.e., tangible or physical) computer-readable storage media, and apparatuses for authenticating a device on a wireless network using a secure attestation package. For instance, in one example, a processing system including at least one processor may obtain receive information related to a device of an Internet of Thing (IoT) service provider, generate a secure attestation package based on the information, transmit the secure attestation package to the IoT service provider, receive a request to access a wireless network of the processor from the device of the IoT service provider, and authorize the device to access the wireless network based on the secure attestation package.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure include methods, non-transitory (i.e., tangible or physical) computer-readable storage media, and apparatuses to generate secure attestation packages for devices on a wireless network. As noted above, IoT devices are one class of devices that are growing in popularity. However, as IoT devices host unknown functionality and are not always fully approved for operating on a network, some components of these devices can be used to attack, for example, the wireless networks and create risks and security issues for the service provider of the wireless network, devices on the wireless network, or other networks connected to the wireless network of the service provider.

To prevent attacks on the wireless networks, wireless network service providers may implement a security protocol to only allow authorized IoT devices to access the wireless networks. Currently available approval processes may be performed via a device certification regimen. Subject matter experts may analyze compliance to requirements of a device wanting to access a wireless network and the results of tests. The current approval process cannot scale due to staffing resource constraints.

The present disclosure provides a method to approve IoT devices that can be performed efficiently and be scaled to a large number of IoT devices. For example, an IoT service provider may provide information related to devices associated with the IoT service provider to a wireless network service provider. The information may be analyzed by the wireless network service provider to generate a secure attestation package (SAP). The SAP may be provided to the IoT service provider to be attached to the devices associated with the IoT service provider.

The IoT devices may then use the SAP to be authorized on the wireless network of the wireless network service provider. The SAP may provide different rules and authorizations on how an IoT device may connect to the wireless network.

The SAP may also provide customized rules for different IoT devices. The wireless network service provider may then monitor activity of each IoT device on the wireless network in accordance with the rules associated with the SAP of a respective IoT device. These and other aspects of the present disclosure are discussed in greater detail below in connection with the examples of FIGS. 1-6.

Figure 1:
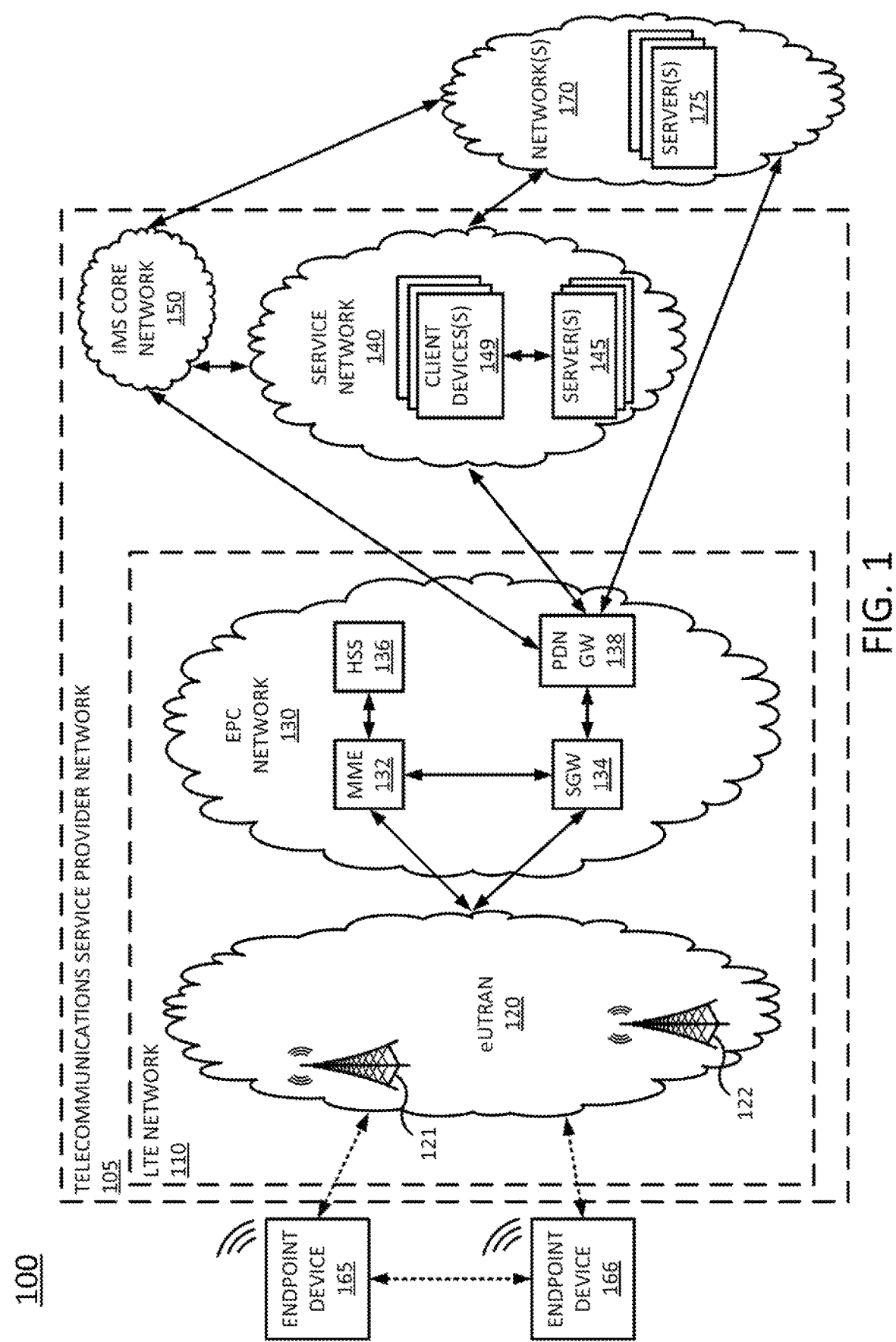
FIG. 1 illustrates an example of a system including a telecommunications service provider network, according to the present disclosure.

FIG. 1 illustrates, without limitation, an example network, or system 100 that may implement or support examples of the present disclosure for authenticating a device on a wireless network using a secure attestation package. In one example, the system 100 includes a telecommunications service provider network 105. The telecommunications service provider network 105 may comprise a Long Term Evolution (LTE) network 110, a service network 140, and a core network, e.g., an IP Multimedia Subsystem (IMS) core network 150. The system 100 may further include other networks 170 connected to the telecommunications service provider network 105. As shown in FIG. 1, the system 100 may connect endpoint devices 165 and 166 with devices, e.g., servers 175 in networks 170, application server 145 in service network 140, etc., with other endpoint devices (not shown) and/or with other components of telecommunications service provider network 105. In one embodiment, the telecommunications service provider 105 may be the wireless network service provider (as discussed below) and the networks 170 may be the IoT service provider (as discussed below).

As illustrated in FIG. 1, each of the endpoint devices 165 and 166 may comprise, for example, an IoT device. In one embodiment, the IoT device may be a device that has no external input/output interface (e.g., a keyboard, display, a mouse, and the like). Rather, the IoT device may be a device with a sensor, a communication interface, and a processor. The IoT device may be deployed to collect certain data and transmit the data over a wireless network (e.g., the telecommunication service provider network 105) to the IoT service provider (e.g., the networks 170) for further analysis and processing.

In one example, endpoint devices 165 and 166 may be equipped for cellular and non-cellular wireless communication. For instance, endpoint devices 165 and 166 may include components which support peer-to-peer and/or short range wireless communications. Thus, each of the endpoint devices 165 and 166 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3rd Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UEs), such as endpoint device 165 and/or endpoint device 166, may access wireless services via the eNodeBs 121 and 122 located in eUTRAN 120. It should be noted that any number of eNodeBs can be deployed in an eUTRAN.

In EPC network 130, network devices such as Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G, 3G, and 5G wireless networks.

In addition, EPC (common backbone) network 130 may comprise a Home Subscriber Server (HSS) 136 that contains subscription-related information (e.g., subscriber (or "user") profiles), performs authentication and authorization of a wireless service user/device, and provides information about the device's location. In some examples, the subscriber may be an entity like an IoT service provider or some other enterprise with many individually subscribed devices. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, service network 140 may comprise one or more devices for providing services to subscribers, customers, and/or users. For example, telecommunications service provider network 105 may provide a cloud storage service, a web server hosting service, and other services. Alternatively, or in addition, one or more devices of service network 140 may be for providing services to internal users and/or automated systems of the telecommunications service provider network 105. As such, service network 140 may represent aspects of telecommunications service provider network 105 where infrastructure for supporting such services may be deployed. In the example of FIG. 1, service network 140 may include servers 145. In one example, each of the servers 145 may comprise all or a portion of a computing device or processing system, such as computing system 600 as described in connection with FIG. 6 below, specifically configured to perform various steps, functions, and/or operations for authenticating a device on a wireless network using a secure attestation package, in accordance with the present disclosure.

Figure 6:
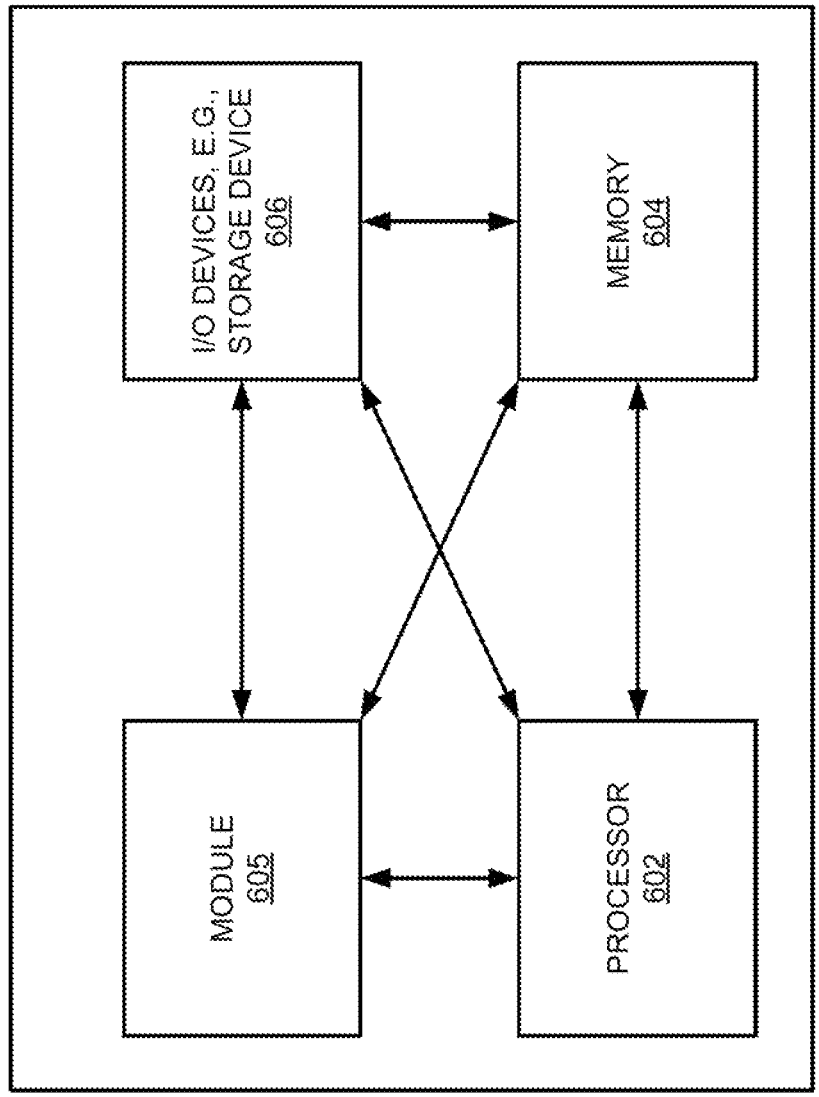
FIG. 6 illustrates a high-level block diagram of a computing device specially programmed to perform the functions described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 6 and discussed below) or multiple computing devices collectively configured to perform various steps, functions, and/or operations in accordance with the present disclosure.

In one example, networks 170 may represent one or more IoT service providers, enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of networks. As illustrated in FIG. 1, networks 170 include one or more servers 175 which may each comprise all or a portion of a computing device or processing system, such as computing system 600 as described in connection with FIG. 6 below, specifically configured to perform various steps, functions, and/or operations in connection with examples of the present disclosure for authenticating a device on a wireless network using a secure attestation package.

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, service network 140, and IMS core network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 121 and 122, PDN GW 138, AS 145, and other components of system 100 are also omitted for clarity.

In accordance with the present disclosure, any one or more of the components of EPC network 130 may comprise network function virtualization infrastructure (NFVI), e.g., host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 132 may comprise a vMME, SGW 134 may comprise a vSGW, and so forth. In this regard, the EPC network 130 may be expanded (or contracted) to include more or less components than the state of EPC network 130 that is illustrated in FIG. 1. For instance, EPC network 130 may be expanded to include additional PDN gateways, e.g., in the form of vPGWs, additional serving gateways (SGWs), e.g., in the form of vSGWs, and so forth. In one example, the host devices may be deployed in one or more geographically diverse data centers. Accordingly, in one example, the network may be segregated into a number of zones, where different VNFs may be deployed in different zones depending upon the respective locations of the one or more data centers. The host devices and VNFs may be controlled by a software defined network (SDN) controller and/or a self-optimizing network (SON) orchestrator, for example.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, a 5G network and the like, an IEEE 802.11-based network, or a future technology or standard-based network, a network implementing various combinations of any one or more of the foregoing technologies, and so on). In one example, servers 145, servers 175, and/or other components may comprise cloud-based and/or distributed data storage and/or processing systems comprising one or more servers at a same location or at different locations. In addition, although the servers 145 and client devices 149 illustrated as components of service network 140, in other examples, any one or more of these components may be deployed in a different configuration. For instance, one or more of the servers 145 may comprise a component of service network 140, LTE network 110, IMS core network 150, and so forth, or may be fully or partially deployed in networks 170. Thus, these and other modifications are all contemplated within the scope of the present disclosure.

Figure 2:
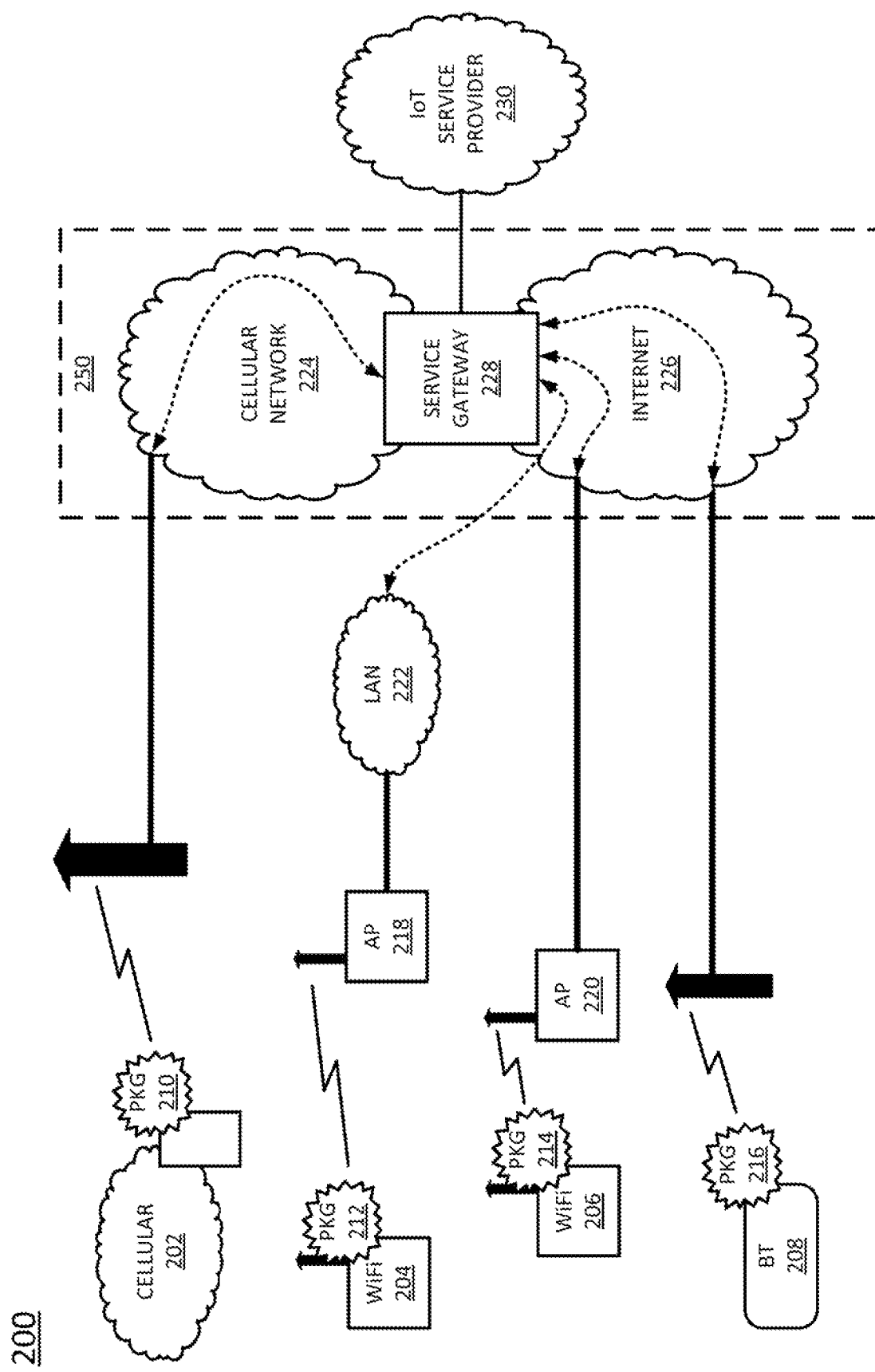
FIG. 2 illustrates an example network diagram of the present disclosure.

To further aid in understanding the present disclosure, FIG. 2 illustrates an example network 200 that has been simplified. In one embodiment, the network 200 may include various IoT devices 202, 204, 206, and 208. Although four different types of IoT devices are illustrated in FIG. 2, it should be note that any number of different types of IoT devices may be deployed in the network 200.

In one embodiment, the IoT devices 202, 204, 206, and 208 may be associated with and deployed by the IoT service provider 230. The IoT devices 202, 204, 206, and 208 may collect various types of data. For example, the IoT device 202 may be a cow collar to track movement of cattle on a farm. The IoT device 204 may be a rain sensor at a location to track rainfall data (e.g., frequency, amounts, compounds in the rainfall, and the like). The IoT device 206 may be a tracking sensor on a vehicle that tracks location and speed data. The IoT device 208 may be a medical device that tracks operational data of the medical device (e.g., a pacemaker). The IoT devices 202, 204, 206, and 208 may include other types of devices such as a grocery tracking device in an appliance, energy usage tracking in an electrical outlet of a home, and the like. The above devices are provided as examples, and other types of devices may be within the scope of the present disclosure.

In one embodiment, the IoT devices 202, 204, 206, and 208 may connect to a wireless network of a wireless network service provider 250 using different access methods. The IoT devices 202, 204, 206, and 208 may connect to a service gateway 228 that connects to the IoT service provider 230. The data collected by the IoT devices 202, 204, 206, and 208 may then be transmitted for further analysis and processing to the IoT service provider 230.

In one embodiment, the different access methods may include a cellular connection to a cellular network 224 or the Internet 226. In one embodiment, the access methods to the Internet 226 may be via an access point (AP) 218 to a local area network (LAN) 222, directly via an AP 220, or via a Bluetooth connection.

In one embodiment, each one of the IoT devices 202, 204, 206, and 208 may have an SAP 210, 212, 214, and 216, respectively. As noted above, the SAP 210, 212, 214, and 216 may be generated by the wireless network service provider and then provided to the IoT service provider 230. The IoT service provider 230 may then attach the SAPs 210, 212, 214, and 216 to the appropriate IoT devices 202, 204, 206, and 208.

As noted above, the SAPs 210, 212, 214, and 216 may be generated based on information about the IoT devices 202, 204, 206, and 208. The SAPs 210, 212, 214, and 216 may contain rules about how the IoT devices 202, 204, 206, and 208 can connect to a particular wireless network 224. For example, the SAP 210 may be for devices that connect to the cellular network 224 via a cellular connection. The SAP 212 may be for Wi-Fi devices that connect to the Internet 226 via the AP 218 and the LAN 222. The SAP 214 may be for Wi-Fi devices that connect to the Internet 226 via Wi-Fi to the AP 220. The SAP 216 may be for Bluetooth devices that connect to the Internet 226 via a Bluetooth connection. The SAPs 210, 212, 214, and 216 may also include customized rules for how the devices 202, 204, 206, and 208 may connect to the wireless network and types of activities or communications that the devices 202, 204, 206, and 208 are allowed to perform over the wireless network.

Figure 3:
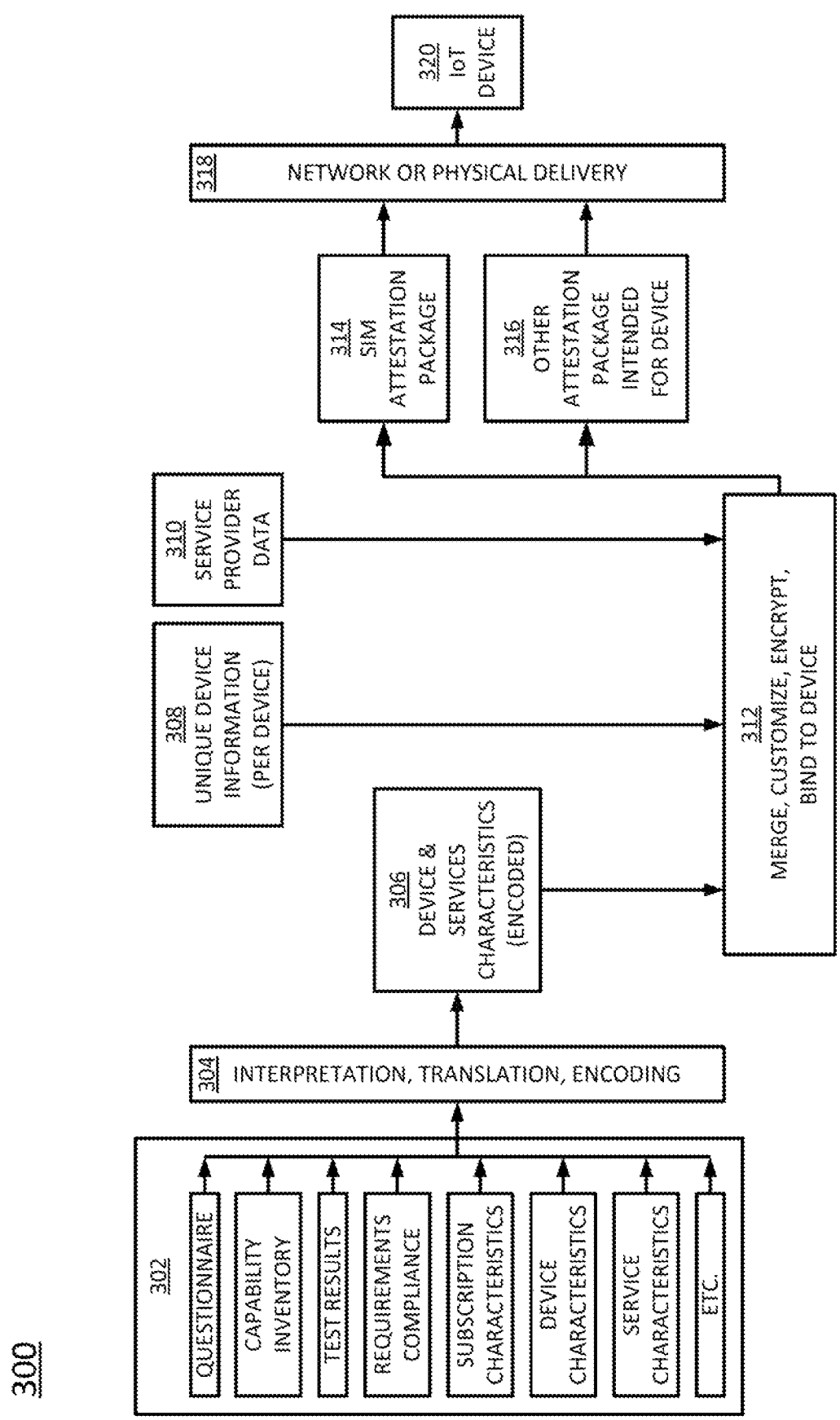
FIG. 3 illustrates an example block diagram of generating and transmitting a secure attestation package to a device of the present disclosure.

FIG. 3 illustrates an example block diagram 300 of how the SAPs 210, 212, 214, and 216 may be generated. The block diagram 300 may be performed by server or processor associated with the wireless network service provider 250 or the telecommunications service provider network 105.

In one embodiment, the wireless network service provider 250 may receive information at block 302 from the IoT service provider 230 regarding various devices associated with the IoT service provider 230 (e.g., the devices 202, 204, 206, and 208). The information may be in the form of a questionnaire that collects specific information related to device identification, device capabilities, and the like. The information may include capability inventory (e.g., what types of sensors or functions are associated with the device), test results (e.g., test performance data of the device), requirements compliance (e.g., certifications of the device to certain standards or other requirements including wireless operator requirements), subscription characteristics (e.g., any subscription data of the device to the wireless network service provider 250), device characteristics (e.g., device identification, device type, type of operating system used to execute applications on the wireless network, a wireless communication protocol used by the device, a physical security associated with the device while active on the wireless network, and the like), service characteristics (e.g., what type of wireless connection), and the like.

At block 304, the information may be interpreted, translated, and encoded. For example, the information may be compiled into a format that is used by the wireless network.

At block 306, the information may be encoded for characteristics of a particular device. At block 308, unique device information may be provided for the device. For example, the particular media access control (MAC address), an authorized international mobile equipment identity (IMEI) number of the device, a device serial number, an identification number associated with a subscriber identification module (SIM) card of the device, an authorized unique identification (UID) of the device, a Bluetooth identification (BID) number of the device, and the like may be added. At block 310, service provider data 310 may be added. For example, certain communication protocol information associated with the wireless network may be provided.

At block 312, the information from blocks 306, 308, and 310 may be merged, customized, encrypted, and bound to a particular device. For example, the SAP 210 may be created for the cellular device 202, the SAP 212 may be created for the Wi-Fi device 204, the SAP 214 may be created for the Wi-Fi device 206, the SAP 216 may be created for the Bluetooth device 208, and so forth. In addition, the information may be bound to a device cryptographically in a way which may render the information unusable on all but a single device, or on multiple, uniquely identifiable devices. As a result, the information cannot be stolen or repurposed in any useful way on another device.

At block 314 the SAPs that are created may be packaged into a subscriber identity module (SIM) card for a particular device. In one embodiment, for known devices, the SIM card may include a full ruleset for connections, authorized activities, types of communication on the wireless network, and the like.

In one embodiment, the IoT service provider 230 may have unknown devices. Thus, SAP for the SIM card of unknown device may provide enough information to authenticate the unknown device to the wireless network. Once the device is connected, the wireless network service provider 250 and the IoT service provider 230 may jointly confirm the international mobile equipment identity (IMEI) of the device and add additional rules to the SAP or an updated SAP over the air to the connected unknown device. The device may then use the completed or updated SAP to reconnect as a known device. At block 316, other attestation packages that are intended for the device may be provided.

At block 318, the SAP may be delivered to an IoT device 320. For example, referring back to FIG. 2, the SAP may be delivered to the IoT service provider 230 over the wireless network. The IoT service provider 230 may then deliver the SAP over the wireless network to the devices 202, 204, 206, and 208. The IoT service provider 230 may attach the SAPs 210, 212, 214, and 216 to the appropriate devices 202, 204, 206, and 208, respectively before the devices 202, 204, 206, and 208 attempt to connect to the wireless network.

In one embodiment, the SAP may include a ruleset for the IoT device 320. The ruleset may allow the wireless network service provider 250 to monitor activity of the IoT device 320 on the wireless network. If any violation occurs, the wireless network service provider 250 may generate and transmit a notification of the violation to the IoT service provider 230.

In one embodiment, the ruleset may be stored in a separate partition of the SAP. Authorization information may also be stored in a separate partition of the SAP. As a result, when the IoT device 320 attempts to connect to the wireless network, the authorization information may be executed first before the ruleset is executed. As a result, partitioning the ruleset in the SAP may reduce overhead and processing when the IoT device 320 requests access to the wireless network. This may reduce the processing significantly when many IoT device 320 attempt to connect to the wireless network at the same time.

Figure 4:
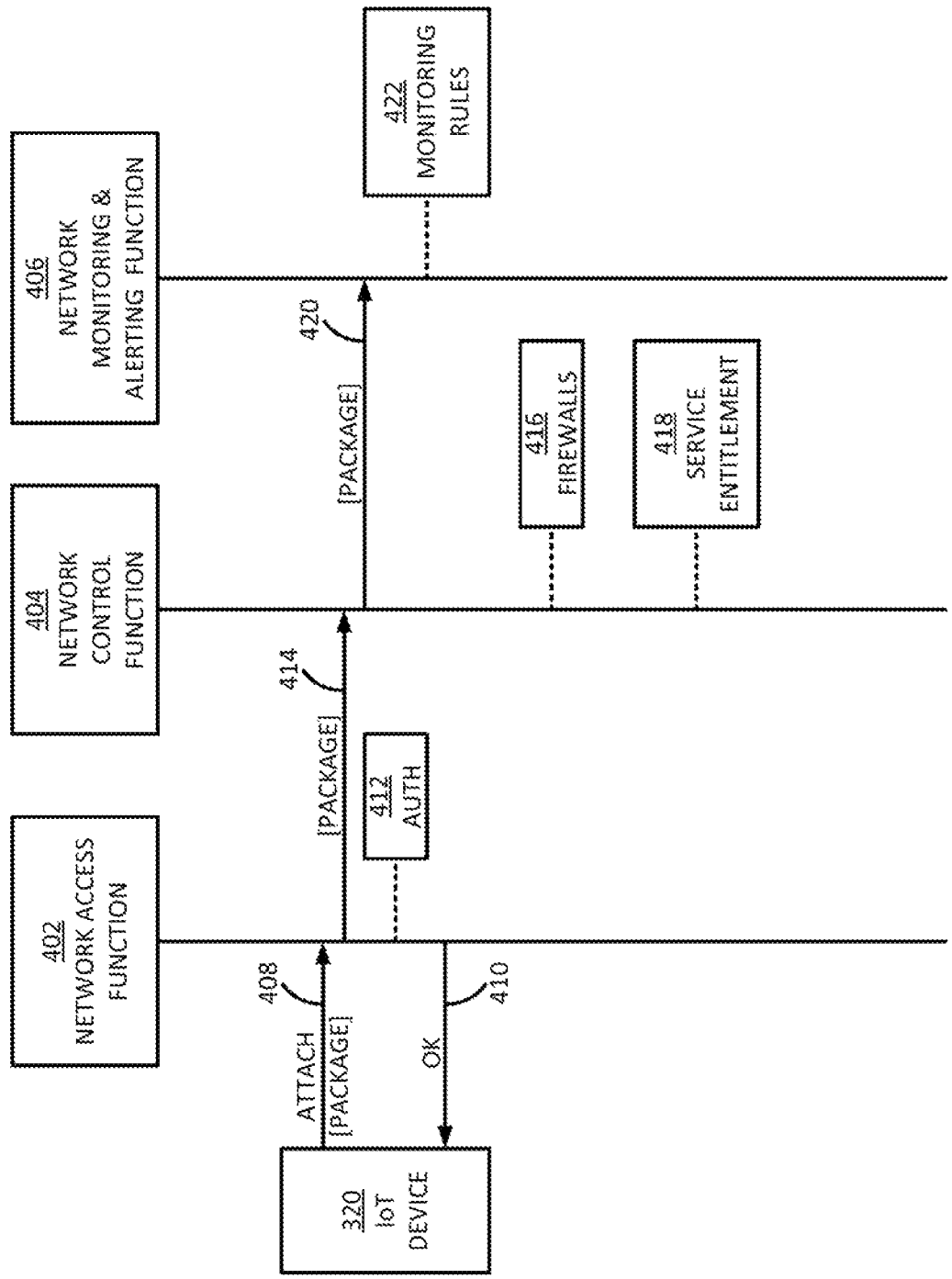
FIG. 4 illustrates an example block diagram of a device authenticating to a wireless network using the secure attestation package of the present disclosure.

FIG. 4 illustrates an example block diagram 400 of the IoT device 320 attempting to authenticate to the wireless network. At block 408, the IoT device 320 may provide the SAP to a network access function 402 of the wireless network. The network access function 402 may compare the authentication information (e.g., ID number associated with a particular access type) to a list of allowed devices, or lookup the authentication information in a table of allowed devices stored in a database. If the IoT device 320 is authenticated, the network access function 402 may transmit an "OK" message at block 410 back to the IoT device 320. The network access function 402 may also provide an authorization for the IoT device 320 at block 412.

At block 414, the IoT device 320 may forward the SAP to a network control function 404. The network control function 404 may provide clearance through any firewalls at block 416 and provide service entitlements at block 418. The network control function 404 may extract any rulesets from the SAP.

The rulesets from the SAP may be provided to a network monitoring and alerting function 406. The network monitoring and alerting function 406 my then monitor rules at block 422. If any rules are violated, the network monitoring and alerting function 406 may generate and transmit a notification of the violation, as described above.

In view of FIGS. 3 and 4 above related to how the SAP is generated, delivered to the IoT device 320, and used to authenticate the IoT device 320 to the wireless network, example scenarios are provided. In a first example, the IoT service provider may want to deploy a fleet of devices throughout a wireless network of the wireless network service provider for weather monitoring.

Prior to permitting the devices of the IoT service provider to connect to the wireless network, information related to the devices is collected (e.g., block 302 in FIG. 3). The information reveals that the device is equipped with smart phone capabilities such as a camera, a microphone, sensors, Wi-Fi communication interfaces, a barometric pressure sensor, global positioning system (GPS) sensor, and the like. However, for weather monitoring only the temperature sensor, barometric pressure sensor, and cellular network interface may be used. In addition, the device is equipped with a customized version of a Linux operating system.

Moreover, the device may communicate with servers of the IoT service provider using user datagram protocol (UDP). Keep alive packets may be transmitted every 12 hours if there are no changes in pressure or temperature. The keep alive packets may be sent to a fixed internet protocol (IP) address. An environmental status update may be transmitted every 3 hours unless there is no change from the previous update. Status updates may be sent to a specific universal resource locator (URL), which resolves to a virtual IP address that can change occasionally.

In addition, the devices are housed in a permanently fixed, physical security-hardened, tamper-evident housing. The tamper alarms may use HTTP POST/TCP to the server of the IoT service provider.

The IoT service provider may expect to provide firmware patches and updates to the device routinely, but on an indeterminate schedule. The "patched" updates may be on the order of a few megabytes and could occur twice monthly. The firmware updates may be expected to be every four months and be 2-4 gigabytes. The updates may occur via the infrastructure of the IoT service provider using SFTP and may be initiated by the IoT device to a server at a specific URL.

The above information may be ingested, interpreted, and encoded by the wireless service provider to produce a ruleset and the SAP for the particular device (e.g., blocks 304-316 of FIG. 3). The ruleset may be added to a configuration profile of the wireless network service provider through which the communication streams of the IoT device may flow. The system may be a monitoring gateway which may be designed to detect anomalies in the pattern of communications based on the information that is configured (e.g., block 422 of FIG. 4).

After the IoT device connects to the wireless network using the SAP and the ruleset is implemented, the wireless network service provider may detect several anomalies observed over the course of a predefined time period (e.g., 30 days). For example, traffic is observed from FTP port 21 (SFTP uses port 22). Frequent outbound HTTP traffic is observed on port 80 using HTTP GET, but no inbound HTTP traffic is ultimately observed. The URLs of the GETs are not what the IoT service provider had previously disclosed. Inbound traffic to the IoT device is observed on port 23 (telnet). An alert may be generated in response to the anomalies. The alert may be transmitted to the IoT service provider.

Based on the alert, the IoT service provider may provide a response to the wireless network service provider. The response may indicate that the Wi-Fi port on the device is active with default passwords. The IoT service provider pushes a new configuration to the device to disable Wi-Fi connectivity and corrects entries in the online form that was completed to provide the information described above. The HTTP traffic observed on port 90 is to a common captive portal connectivity URL. The implication is that someone is attempting Wi-Fi access and the device is using standard OS mechanisms to find a route to the Internet. The cellular interface represents one potential opportunity for an Internet connection so the HTTP connectivity checks are going out over that interface. The mitigation noted above, to disable Wi-Fi connectivity, may eliminate the possibility of unauthorized access via Wi-Fi.

In addition, something on the device is trying to make outbound connections using FTP and telnet. Since this is not part of the service disclosed for example at block 302, it suggests the device has been compromised and modified. The IoT service provider determines that the device has been physically tampered with and sends field personnel to replace them with a more hardened version of the OS which performs integrity checks to guard against the installation of unauthorized software.

Lastly, the IoT service provider pushes firmware updates to the entire fleet of devices to upgrade them to the integrity checking version of the OS. In the example, this activity would have been the second full update in four months and would have triggered an alert vis-à-vis the expected firmware update schedule. Since the IoT service provider provided advanced notice, the wireless network service provider operations personnel configured a one-time exception to suppress the alert which would have occurred.

In a second example, an IoT service provider plans to deploy a critter monitoring service. Devices may come in three different configurations. A first configuration may be cellular, for applications where battery power is not a constraint. Cellular devices connect via the wireless network to the IoT service provider via a Service Gateway (SG). A second configuration may be Bluetooth (BT), for low energy applications where battery life is critical. BT devices connect to "BT towers" deployed so that devices can transfer when they are in range. The towers connected via an internet VPN to Service Gateway which bridges the wireless network and the internet and connects to the IoT service provider. A third configuration may be Wi-Fi, for environments where Wi-Fi access is beneficial or appropriate. Wi-Fi connects to the SG via the internet directly from a Wi-Fi Access Point (AP) or via LAN access. The devices may be identical except for packaging and power sources. The devices may be configured at first boot to use only the cellular network, only BT, or only Wi-Fi. FIG. 2 illustrates an example of the devices and the various access networks to connect to a wireless network.

The IoT service provider may complete the online form or questionnaire to provide information, similar to the first example described above. The specific access types are indicated in the answers to the online form. For cellular devices, the IoT service provider provides IMEIs for some, but not all devices that are expected to be deploy. The wireless network service provider provides pre-provisioned SIM cards for these devices.

The IoT service provider conveys to the wireless network service provider that some cellular devices will connect but their IMEIs are not yet known. The IoT service provider should provide the Type Allocation Code (TAC) of the devices. (The TAC is the initial 8 digit code of the IMEI and it uniquely identifies the device equipment). The wireless network service provider may supply SIM cards for these devices and makes a record that the associated UUIC IDs (SIM card IDs) are associated with future cellular devices associated with the IoT service provider. Eventually, these devices will behave identically to known cellular devices.

The IoT service provider provides a Unique ID (UID) for each Wi-Fi device. The wireless network service provider provides device-specific "attestation packages" (a data file)

for each of these devices. The IoT service provider provides a Unique Bluetooth ID (BID) for each BT device. The wireless network service provider provides device-specific "attestation packages" (a data file) for these devices.

Similar to the first example, the device and connectivity information is ingested by the wireless network service provider and encoded into rulesets. However, the rulesets are not added to a configuration profile in the wireless network, as done in the first example. Instead, the rulesets are encoded directly into a partition within each SAP. This may save some provisioning overhead because the configuration may take place after the devices connect to the wireless network.

Specific device information (e.g., IMEIs, UIDs, and BIDs) may also be incorporated during the ingestion process. The wireless network service provider uses this information uniquely and securely to associate each SAP with one and only one device or device type (for example, a plurality of uniquely identifiable devices that are a similar device type). As devices go online, different operations occur based on the type of device and whether the SAP is available.

Figure 5:
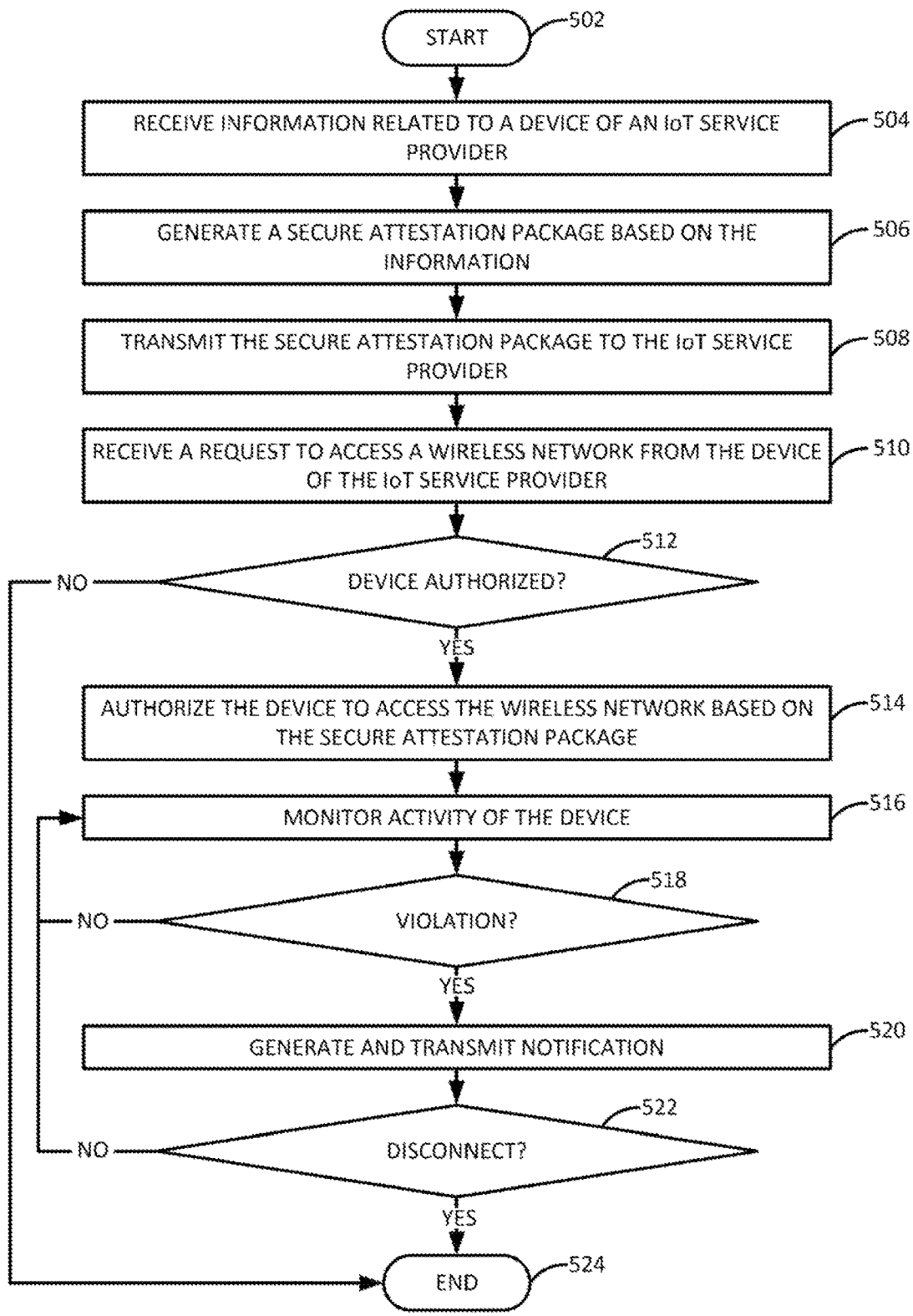
FIG. 5 illustrates a flowchart of an example method for authenticating a device on a wireless network using a secure attestation package of the present disclosure.

FIG. 5 illustrates a flowchart of an example method 500 for authenticating a device on a wireless network using a secure attestation package of the present disclosure. In one example, steps, functions and/or operations of the method 500 may be performed by a processor or server 145 of the telecommunications service provider network 105, the wireless network service provider 250, or operations of method 500 may be performed by a computing device or processing system, such as computing system 600 and/or hardware processor element 502 as described in connection with FIG. 6 below. The method 500 begins in step 502 and proceeds to step 524.

At step 502, the method 500 begins. At step 504, the method 500 receives information related to a device of an IoT service provider. For example, the IoT service provider may complete an online form or questionnaire to provide information related to devices that may be deployed by the IoT service provider on the wireless network of a wireless network service provider. As noted above, the information may include device capability of the device, a type of operating system used to execute applications on the wireless network, a communication protocol of the device on the wireless network, a physical security associated with the device while active on the wireless network, a type of access network used by the device to access the wireless network, and the like.

At step 506, the method 500 generates a secure attestation package (SAP) based on the information. In one embodiment, the SAP may include identification (ID) information for a particular device so that the SAP may be generated and used for only a single device. In other words, a unique SAP may be generated for each device of the IoT service provider that may access the wireless network. In one embodiment, the SAP may include an IMEI number of a device for cellular network access, an identification number associated with a SIM card provided to the IoT service provider for the device, an authorized UID number of a device for Wi-Fi network access, a Bluetooth identification (BID) number of a device for Bluetooth network access, and the like.

In one embodiment, a ruleset may also be created based on the information for a particular device. The ruleset may be stored in the wireless network and the SAP. The wireless network service provider may use the ruleset to monitor activity of the device to determine if any anomalies or violations of the ruleset occur, as discussed below.

At step 508, the method 500 transmits the secure attestation package to the IoT service provider. In one embodiment, the SAP may be attached to a particular device by the IoT service provider before the device attempts to connect to the wireless network.

At step 510, the method 500 receives a request to access a wireless network from the device of the IoT service provider. For example, the SAP attached to the device may be provided to the wireless network for authorization. In one embodiment, the authentication information and the ruleset of the SAP may be stored in separate partitions to save processing overhead. As a result, the ruleset may be initialized as a separate process after the device is authenticated based on the authentication information.

At step 512, the method 500 determines if the device is authorized. If the device is authorized, the method 500 proceeds to step 514. If the device is not authorized, the method 500 proceeds to step 524. For example, the authentication information may be compared to stored authentication information. If a match is found, then the device may be authorized. If no match is found, then the device may not be authorized.

At step 514, the method 500 authorizes the device to access the wireless network based on the secure attestation package. For example, the device may be allowed to communicate over the wireless network. In addition, the ruleset of the SAP may be initialized.

At step 516, the method 500 monitors activity of the device. For example, the wireless network service provider may collect communication information or activity of the device and compare the activity to the ruleset associated with the SAP of the device.

At step 518, the method 500 determines if a violation has occurred. If a violation has occurred, the method 500 proceeds to step 520. If no violation has occurred, the method 500 returns to step 516 to continue monitoring the activity of the device.

At step 520, the method 500 generates and transmits a notification. For example, the notification may indicate that the activity of the device violates a rule associated with the SAP. The notification may be transmitted to the IoT service provider. In response to the notification the IoT service may transmit an update to the device based on the monitoring to correct the violation. The update may be to turn off a feature that may be causing the violation (e.g., turning off Wi-Fi access, as described above in the first example), may be a software patch, and the like.

At step 522, the method 500 determines if the device has disconnected from the wireless network. If the device has disconnected, the method 500 proceeds to step 524. If the device has not disconnected, the method 500 may return to step 516 to continue monitoring the activity of the device. At step 524, the method 500 ends.

It should be noted that the method 500 may be expanded to include additional steps, or may be modified to replace steps with different steps, to combine steps, to omit steps, to perform steps in a different order, and so forth. In addition, although not expressly specified above, one or more steps of the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 5 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 6 depicts a high-level block diagram of a computing system 600 (e.g., a computing device or processing system) specifically programmed to perform the functions described herein. For example, any one or more components, devices, and/or systems illustrated in FIG. 1 or FIG. 2, may be implemented as the computing system 600. As depicted in FIG. 6, the computing system 600 comprises a hardware processor element 602 (e.g., comprising one or more hardware processors, which may include one or more microprocessor(s), one or more central processing units (CPUs), and/or the like, where the hardware processor element 602 may also represent one example of a "processing system" as referred to herein), a memory 604, (e.g., random access memory (RAM), read only memory (ROM), a disk drive, an optical drive, a magnetic drive, and/or a Universal Serial Bus (USB) drive), a module 605 for authenticating a device on a wireless network using a secure attestation package, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 602 is shown, the computing system 600 may employ a plurality of hardware processor elements. Furthermore, although only one computing device is shown in FIG. 6, if the method(s) as discussed above is implemented in a distributed or parallel manner for a particular illustrative example, e.g., the steps of the above method(s) or the entire method(s) are implemented across multiple or parallel computing devices, then the computing system 600 of FIG. 6 may represent each of those multiple or parallel computing devices. Furthermore, one or more hardware processor elements (e.g., hardware processor element 602) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 602 can also be configured or programmed to cause other devices to perform one or more operations as discussed above. In other words, the hardware processor element 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 605 for authenticating a device on a wireless network using a secure attestation package (e.g., a software program comprising computer-executable instructions) can be loaded into memory 504 and executed by hardware processor element 602 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 602) executing the computer-readable instructions relating to the above described method(s) can be perceived as a programmed processor or a specialized processor. As such, the present module 605 for authenticating a device on a wireless network using a secure attestation package (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
receiving, by a processor, information related to a device of an internet of thing service provider;
generating, by the processor, a secure attestation package based on the information, wherein the secure attestation package includes authorization information and a ruleset associated with the device based on the information that was received;
transmitting, by the processor, the secure attestation package to the internet of thing service provider;
receiving, by the processor, a request to access a wireless network of the processor from the device;
authorizing, by the processor, the device to access the wireless network based on the authorization information; and
monitoring, by the processor, an activity of the device on the wireless network using the ruleset after the device has accessed the wireless network in response to the authorizing.

2. The method of claim 1, further comprising:
transmitting, by the processor, an update to the device based on the monitoring.

3. The method of claim 1, wherein the information comprises a device capability of the device that is used on the wireless network.

4. The method of claim 1, wherein the information comprises a type of operating system used to execute an application on the wireless network.

5. The method of claim 1, wherein the information comprises a communication protocol of the device on the wireless network.

6. The method of claim 1, wherein the information comprises physical security associated with the device while active on the wireless network.

7. The method of claim 1, wherein the information comprises a type of access network used by the device to access the wireless network.

8. The method of claim 7, wherein the secure attestation package comprises an authorized international mobile equipment identity number of the device for cellular network access.

9. The method of claim 7, wherein the secure attestation package comprises an identification number associated with a subscriber identification module card provided to the internet of thing service provider for the device.

10. The method of claim 7, wherein the secure attestation package comprises an authorized unique identification number of the device for wi-fi network access.

11. The method of claim 7, wherein the secure attestation package comprises a bluetooth identification number of the device for bluetooth network access.

12. The method of claim 1, wherein the secure attestation package is attached to the device before the device sends the request to access the wireless network.

13. The method of claim 1, wherein the ruleset is stored in a partition of the secure attestation package that is separate from a partition of the secure attestation package in which the authorization information is stored.

14. The method of claim 13, wherein the processor executes the authorization information before executing the ruleset.

15. The method of claim 1, wherein the ruleset specifies at least one of: a connection of the device, an authorized activity of the device, or a type of communication of the device on the wireless network.

16. The method of claim 1, wherein the ruleset is added to a configuration profile of a service provider of the wireless network.

17. The method of claim 1, further comprising:
transmitting, by the processor, an update to the device to correct a violation that is detected by the monitoring.

18. The method of claim 1, further comprising:
transmitting, by the processor, a notification to the device when the activity of the device violates a rule of the ruleset.

19. A non-transitory computer-readable medium storing instructions which, when executed by a processing system including at least one processor, cause the processing system to perform operations, the operations comprising:
receiving information related to a device of an internet of thing service provider;
generating a secure attestation package based on the information, wherein the secure attestation package includes authorization information and a ruleset associated with the device based on the information that was received;
transmitting the secure attestation package to the internet of thing service provider;
receiving a request to access a wireless network of the processing system from the device;
authorizing the device to access the wireless network based on the authorization information; and
monitoring an activity of the device on the wireless network using the ruleset after the device has accessed the wireless network in response to the authorizing.

20. An apparatus comprising:
a processor; and
a non-transitory computer readable medium storing instructions which, when executed by the processor, cause the processor to perform operations, the operations comprising:
receiving information related to a device of an internet of thing service provider;
generating a secure attestation package based on the information, wherein the secure attestation package includes authorization information and a ruleset associated with the device based on the information that was received;
transmitting the secure attestation package to the internet of thing service provider;
receiving a request to access a wireless network of the processor from the device;
authorizing the device to access the wireless network based on the authorization information; and
monitoring an activity of the device on the wireless network using the ruleset after the device has accessed the wireless network in response to the authorizing.

* * * * *